United States Patent
Ninomiya

(10) Patent No.: US 12,547,495 B2
(45) Date of Patent: Feb. 10, 2026

(54) SEMICONDUCTOR MEMORY DEVICE AND CONTROLLING METHOD THEREOF

(71) Applicant: Winbond Electronics Corp., Taichung (TW)

(72) Inventor: Toshio Ninomiya, Yokohama (JP)

(73) Assignee: WINBOND ELECTRONICS CORP., Taichung (TW)

( * ) Notice: Subject to any disclaimer, the term of this patent is extended or adjusted under 35 U.S.C. 154(b) by 0 days.

(21) Appl. No.: 18/670,014

(22) Filed: May 21, 2024

(65) Prior Publication Data

US 2025/0061019 A1    Feb. 20, 2025

(30) Foreign Application Priority Data

Aug. 14, 2023   (JP) ................................ 2023-131858

(51) Int. Cl.
*G06F 11/00*    (2006.01)
*G06F 11/10*    (2006.01)

(52) U.S. Cl.
CPC ................................ *G06F 11/1044* (2013.01)

(58) Field of Classification Search
CPC .................................................. G06F 11/1044
See application file for complete search history.

(56) References Cited

U.S. PATENT DOCUMENTS

2015/0355886 A1   12/2015   Peeters et al.
2016/0062860 A1*   3/2016   Yang .................... G06F 11/1048
                                                                714/711

FOREIGN PATENT DOCUMENTS

| CN | 107710326 A | 2/2018 | |
| JP | 2016-508658 A | 3/2016 | |
| TW | 202004767 A | 1/2020 | |
| WO | WO-03001381 A1 * | 1/2003 | .......... G06F 11/1016 |

* cited by examiner

*Primary Examiner* — Amine Riad
(74) *Attorney, Agent, or Firm* — Birch, Stewart, Kolasch & Birch, LLP

(57) ABSTRACT

A semiconductor memory device includes a memory unit and an error detection and correction unit. The memory unit is an OTP memory including a data memory and a check memory. The data memory is written with replacement address information detected during a redundancy repair operation and corresponding to a defective memory cell of a memory cell array. The check memory is written with check information detected during the redundancy repair operation and corresponding to the replacement address information. The error detection and correction unit performs error detection and correction on the replacement address information based on the check information. The data memory includes a unit accommodating the replacement address information. When other replacement address information and any of the replacement address information and the check information corresponding to the replacement address information are in the unit, the error detection and correction unit will not perform error detection and correction.

8 Claims, 3 Drawing Sheets

SEMICONDUCTOR MEMORY DEVICE AND CONTROLLING METHOD THEREOF

CROSS REFERENCE TO RELATED APPLICATIONS

This Application claims priority of Japanese Patent Application No. 2023-131858, filed on Aug. 14, 2023, the entirety of which is incorporated by reference herein.

BACKGROUND OF THE INVENTION

Field of the Invention

The present invention relates to a semiconductor memory device and a control method of the semiconductor memory device.

Description of the Related Art

Dynamic Random Access Memory (DRAM) generally uses a redundancy circuit to repair a bad memory cell by replacing them with a redundant memory cell when a bad memory cell is detected in a memory cell array to improve a yield rate. Here, address information of the bad memory cell is generally programmed into the one-time programmable memory to replace the bad memory cell with the redundant memory cell. However, if the one-time programmable memory configured to store the address information of the defective memory cell itself is defective and causes data errors, the yield rate will be reduced. Therefore, there is a one-time programmable memory equipped with an Error Checking and Correcting (ECC) function to repair such data errors. However, there is still room for improvement in related technologies.

BRIEF SUMMARY OF THE INVENTION

The present invention provides a semiconductor memory device. The semiconductor memory device includes a memory unit and an error detection and correction unit. The memory unit is a one-time programmable memory including a data memory and a check memory. The data memory is written with replacement address information detected during the redundancy repair operation and corresponding to a defective memory cell of a memory cell array. The check memory is written with check information detected during the redundancy repair operation and corresponding to the replacement address information. The error detection and correction unit performs error detection and correction on the replacement address information based on the check information. Wherein, the data memory includes a unit accommodating the replacement address information. Wherein, when any of the replacement address information and the check information corresponding to the replacement address information is in the unit, and other replacement address information is also in the unit, the error detection and correction unit will not perform error detection and correction.

When any of the replacement address information and the check information corresponding to the replacement address information is in the unit, and other replacement address information is also in the unit, unexpected errors may be detected if the other replacement address information and the check information corresponding to the replacement address information are applied in error detection and correction. Therefore, in the present invention, error detection and correction will not be performed in this case to avoid detecting unexpected errors and improve the overall yield rate.

In a preferred specific structure of the present invention, the semiconductor memory device further includes a control unit. The control unit determines whether the check information corresponding to the replacement address information is written into the unit. When the check information is written, a flag is set to a first logical value. When the flag is set to the first logical value, the error detection and correction unit will not perform error detection and correction. Therefore, a control unit can set whether to perform error detection and correction by setting a flag.

The present invention provides a control method of the semiconductor memory device. The semiconductor memory device includes a memory unit. The memory unit is a one-time programmable memory including a data memory and a check memory. The data memory is written with replacement address information that is detected during a redundancy repair operation and is a defective memory cell of a memory cell array. The check memory is written with check information that is detected during the redundancy repair operation and corresponds to the replacement address information. The data memory includes a unit that can write the replacement address information. The control method of the semiconductor memory device includes an error detection and correction step. The error detection and correction step performs error detection and correction on the replacement address information based on the check information. Wherein, when any of the replacement address information and the check information corresponding to the replacement address information is in the unit, and other replacement address information is also the unit, the error detection and correction unit will not perform error detection and correction.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following describes a semiconductor memory device and a control method of the semiconductor memory device related to the embodiment of the present invention in detail with reference to the accompanying drawings. However, this embodiment is only an illustrative example, and the present invention is not limited thereto.

Figure 1:
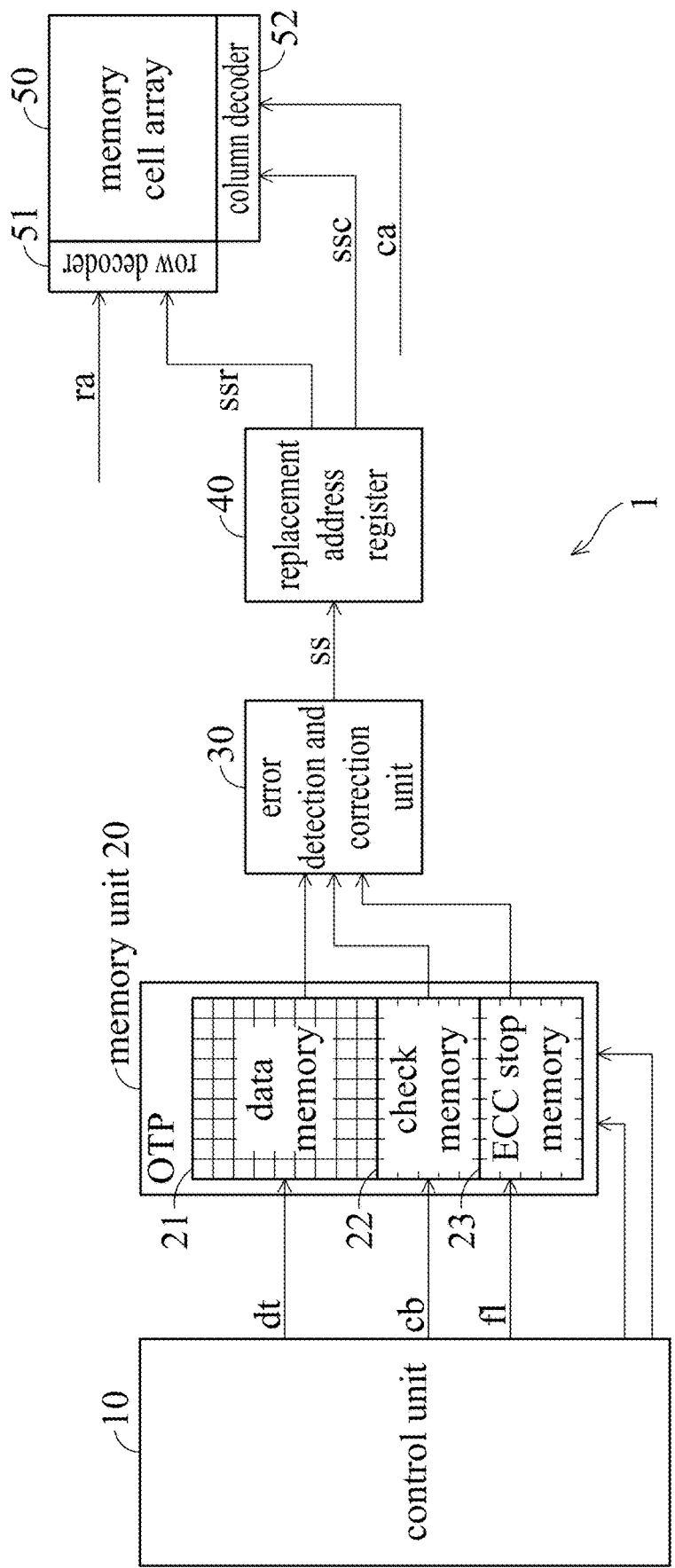
FIG. 1 is a block diagram that shows a structural example of the semiconductor memory device related to Embodiment 1.

FIG. 1 is a block diagram that shows a structural example of the semiconductor memory device 1 related to Embodiment 1. The semiconductor memory device 1 of the present invention includes a control unit 10, a memory unit 20, an error detection and correction (ECC) unit 30, a replacement address register 40, and a memory cell array 50 serving as a data area. The semiconductor memory device 1 in this embodiment is a volatile memory. After produced, such a semiconductor memory device 1 goes through a plurality of repair test procedures (wafer testing, post packaging testing, etc.) to perform redundancy repair operations on defective memory cells.

When a defective memory cell is detected by performing the redundancy repair operation on the memory cell array 50, replacement address information dt and corresponding check information cb are input to the memory unit 20 as defective memory cells. Then, as needed, the replacement address information ss is obtained by performing error detection and correction through the error detection and correction unit 30 provided for the memory unit 20. The replacement address information ss is input to the replacement address register 40 to perform the redundancy repair operation on the memory cell array 50 according to the replacement address information ss. This will be illustrated in detail below.

When the redundancy repair operation for the memory cell array 50 detects a defective memory cell, the control unit 10 generates and inputs the replacement address information dt and the corresponding check information cb of the defective memory cell into the memory unit 20. The replacement address information dt may include the replacement address information of the defective memory. In addition, the control unit 10 generates and inputs the ECC stop flag fl into the memory unit 20. The ECC stop flag fl is configured to start/stop ECC operations performed by the error detection and correction unit 30. When the ECC operations are stopped, the ECC stop flag fl is a high level "1". When the ECC operations are started, the ECC stop flag fl is a low level "0".

The memory unit 20 is composed of a one-time programmable (OTP) memory, e.g., a laser programmable fuse or an electrically programmable fuse (e-fuse). In this embodiment, the memory unit 20 is exemplified by an electrically programmed fuse. The memory unit 20 includes a data memory 21, a check memory 22, and an ECC stop memory 23. The data memory 21, the check memory 22, and the ECC stop memory 23 of the memory unit 20 are composed of a plurality of memory cells two-dimensionally arranged corresponding to rows and columns. The data memory 21 is configured to store the replacement address information dt. The check memory 22 is configured to store the check information cb corresponding to the replacement address information dt. The ECC stop memory 23 is configured to store the ECC stop flag fl.

The replacement address information dt, the check information cb, and the ECC stop flag fl output from the storage unit 20 are input to the error detection and correction unit 30. If the input of the ECC stop flag fl is "1" (the first logical value), the error detection and correction unit 30 will not perform error detection and correction (error detection and correction step). The error detection and correction unit 30 directly use the replacement address information dt as the replacement address information ss to generate replacement address information ss. If the input of the ECC stop flag fl is "0" (the second logical value), the error detection and correction unit 30 will perform error detection and correction based on the replacement address information dt and the check information cb. If there is an error, the error detection and correction unit 30 performs correction and generates the correct replacement address information ss. The error detection and correction unit 30 inputs the generated replacement address information ss into the replacement address register 40.

The replacement address register 40 is configured to temporarily store the replacement address information ss input from the error detection and correction unit 30, and input the row replacement address information ssr and column replacement address information ssc into the decoder 51 and the row decoder 52 respectively.

The memory cell array 50 includes a plurality of memory cells (not shown) arranged two-dimensionally corresponding to rows and columns. The row decoder 51 receives and decodes row address information ra, row replacement address information ssr, etc. Then, a word line is selected based on the decoding result, and a voltage for writing and reading data is applied. In addition, the column decoder 52 receives and decodes column address information ca, column replacement address information ssc, etc. Then, a bit line is selected based on the decoding result, and a voltage for writing and reading data is applied.

The memory unit 20 is described in detail below based on FIG. 2. The data memory 21, the check memory 22, and the ECC stop memory 23 of the memory unit 20 are composed of each "unit". The "unit" here is a unit in which the error detection and correction unit 30 detects/corrects a 1-bit error. The memory unit 20 is composed of a plurality of units. In addition, in this embodiment, this "unit" is not a unit corresponding to a predetermined area of the memory cell array 50, but it is not limited to this. Depending on the repair method of the redundancy repair operation, this "unit" can also be set to a unit corresponding to a predetermined area of the memory cell array 50.

Figure 2:
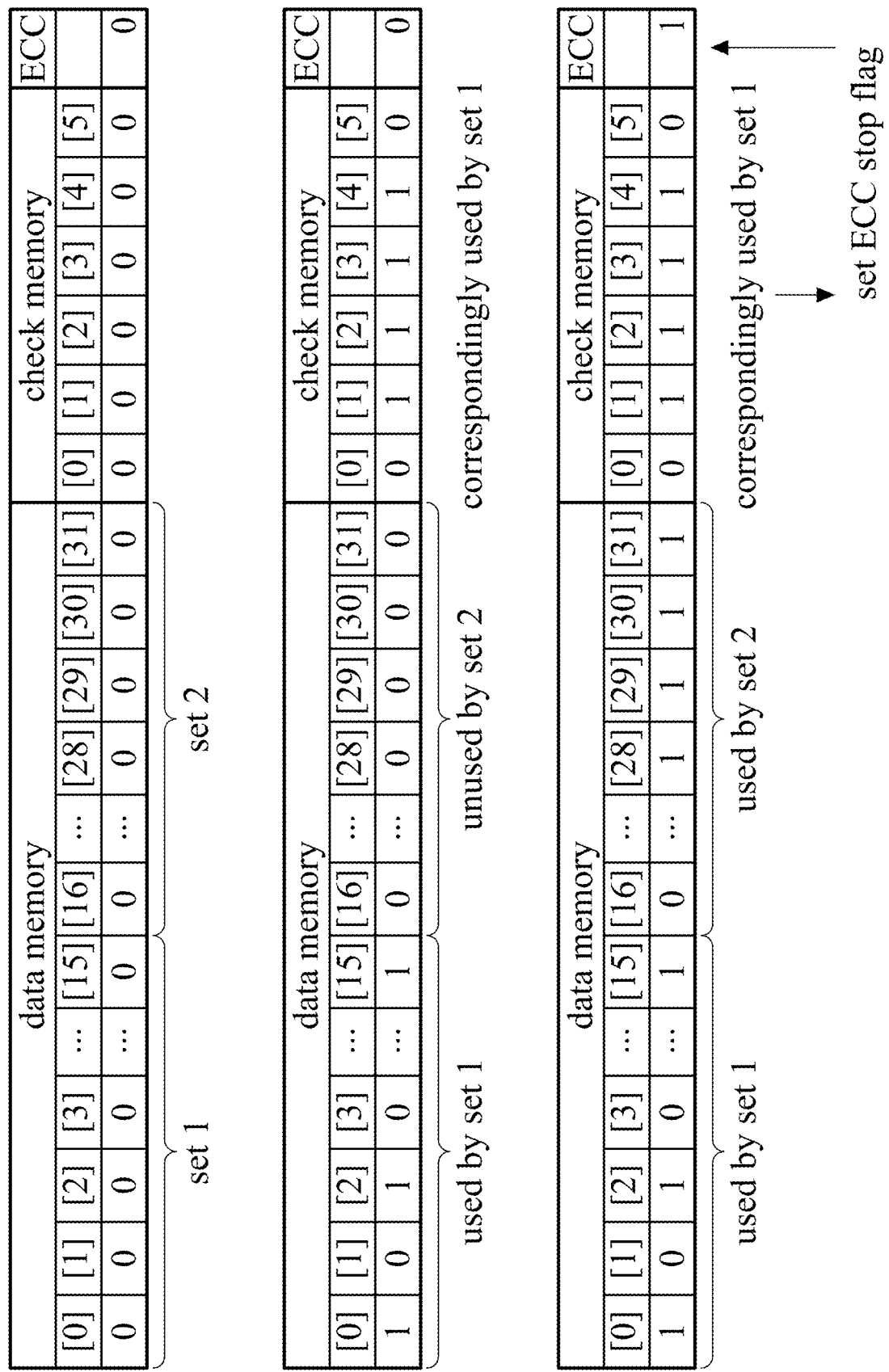
FIG. 2 is a block diagram that shows an operation example of a memory unit in the semiconductor memory device related to Embodiment 1.

As shown in FIG. 2, in each unit, the data memory 21 is 32 bits, the check memory 22 is 6 bits, and the ECC stop memory 23 is 1 bit. The size of the data memory 21 is a size of a plurality of sets of replacement address information dt.

Specifically, as shown in the upper row of FIG. 2, the data memory 21 of this embodiment has a size that allows the replacement address information dt to be placed in bits [0]~[15] in a set, and allows another replacement address information to be placed in bits [16]~[31] in a set. Therefore, the data memory 21 has a size that can accommodate two sets, set 1 and set 2, of the replacement address information dt. In addition, the replacement address information dt can also be input into the data memory 21 according to any appropriate size. For example, the replacement address information dt can be placed in bits [0]~[7], [8]~[15], [16]~[23], [24]~[31] in a set respectively.

After produced, such a semiconductor memory device 1 goes through a plurality of repair test procedures (wafer testing, post packaging testing, etc.) to perform redundancy repair operations on defective memory cells. Initially, when starting the redundancy repair operation, the control unit 10 determines whether the check memory has been written. If the check memory has not been written, the ECC stop flag fl keeps at "0".

Next, the redundancy repair operation is started for the memory cell array 50. When a defective memory cell is detected, as shown in the middle row of FIG. 2, the control unit 10 inputs the replacement address information dt of this defective memory cell to set 1 of the data memory 21 (bits [0]~[15] of the data memory 21). At the same time, the control unit 10 input the corresponding check information cb into bits [0]~[5] of the check memory 22. Next, the replacement address information dt, the check information cb, and the ECC stop flag fl that indicates "0" of set 1 are input to the error detection and correction unit 30.

Since the ECC stop flag fl that indicates "0" is input, the error detection and correction unit 30 will perform error detection and correction based on the replacement address information dt and the check information cb. Then, if an error is detected, the error detection and correction unit 30 performs correction, generates the replacement address information ss, and inputs it into the replacement address register 40.

Then, other redundancy repair operations are started for the memory cell array 50. When a defective memory cell is detected, as shown in the lower row of FIG. 2, the control unit 10 inputs the replacement address information dt of this defective memory cell to bits [16]~[31] of the data memory 21. However, due to the previous redundancy repair operation, the check memory 22 has already been written with the check information cb corresponding to the replacement address information dt of set 1. Moreover, since the memory unit 20 is a one-time programmable memory, the check information cb corresponding to the replacement address information dt of the set 2 cannot be input. In other words, the value of the check memory 22 still keeps the check information cb corresponding to the replacement address information dt of set 1. If the replacement address information dt and the check information cb of set 2 are input to the error detection and correction unit 30, and error detection and correction are performed, the replacement address information dt and the check information cb will be inconsistent with expected values. As a result, wrong error detection is performed, and the value of the replacement address information dt is corrected to an unexpected value.

Therefore, in this embodiment, the control unit 10 will perform a flag setting operation (flag setting step) when this other redundancy repair operation starts. During the flag setting operation, the ECC stop flag fl is initially "0", and the control unit 10 determines whether the test memory 22 has been written. If it has been written, the ECC Flag fl is set to "1". Then, when the ECC stop flag fl with "1" is input to the error detection correction unit 30, the error detection correction unit 30 will not perform error detection and correction based on the replacement address information dt and the check information cb. Then, the error detection and correction unit 30 outputs the replacement address information dt of the set 2 input from the data memory 21 as the replacement address information ss to the replacement address register 40.

Like this, in this embodiment, when a plurality of replacement address information is written in the data bits, and the check information corresponding to one of the replacement address information has been written, the control unit 10 sets the ECC stop flag fl to prevent the error detection and correction unit 30 from performing error detection and correction. Therefore, the error detection and correction unit 30 can be prevented from detecting unexpected errors and the overall yield rate can be improved.

In addition, in this embodiment, when the ECC stop flag fl is input to the error detection and correction unit 30 with "1", the error detection and correction unit 30 will not perform error detection and correction. In other embodiments, when the ECC stop flag fl is input to the error detection and correction unit 30 with "1", and it is confirmed through error evaluation that there is no defective memory cell in the unit, the error detection and correction unit 30 will not perform the ECC operations. In this embodiment, the voltage may be set outside the range of normal operation conditions for error evaluation, for example. Specifically, by setting the voltage higher or lower than the voltage of the normal operation conditions, the replacement address information dt and the ECC stop flag fl can be read, and the error evaluation can be performed to confirm whether an error occurs. In addition, the time for performing error evaluation may be the time when the error detection and correction unit 30 performs error detection, the time before all repair test procedures are started, the time point when each repair test procedure is started, etc. By further performing error evaluation, even if the corresponding check information is not input when the second set of replacement address information is input, the reliability of the replacement address information can be improved.

Figure 3:
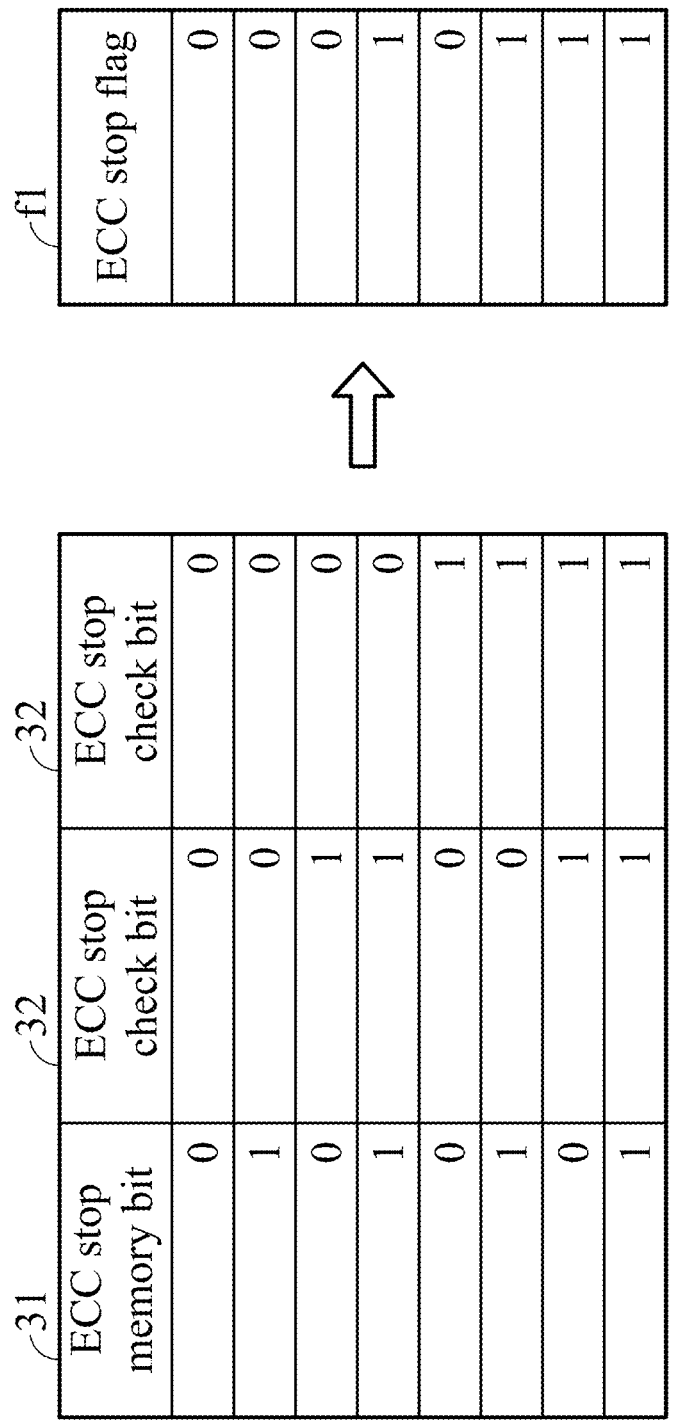
FIG. 3 is a block diagram that shows a structure of a memory unit in the semiconductor memory device related to Embodiment 2.

Next, Embodiment 2 will be described. The difference between Embodiment 2 and Embodiment 1 is that the ECC stop memory 23 is composed of a plurality of bits. As shown in FIG. 3, the ECC stop memory 23 may include, for example, a 1-bit ECC stop data bit 31 and a 2-bit ECC stop check bit 32. In this embodiment, whether the ECC stop flag fl in the unit is set can be determined through the ECC stop data bit 31 and the ECC stop check bit 32. For example, if the ECC stop data bit 31 is "0" and the ECC stop check bit 32 is "00", the ECC stop flag fl is not set (i.e., fl="0"). In addition, if the ECC stop data bit 31 is "1" and the ECC stop check bit 32 is "11", the ECC stop flag fl is set (i.e., fl="1").

In this embodiment, the control unit 10 determines whether the check information has been written in the check memory when other redundancy repair operations are start, and writes the ECC stop memory according to the result. For example, if the check information has been written into the check memory, the control unit 10 writes "1" into the ECC stop data bit, and inputs "11" into the ECC stop check bit. Then, before performing the ECC operation, the error detection and correction unit 30 first performs the ECC operation based on the ECC stop data bit 31 and the ECC stop check bit 32. Then, the error detection and correction unit 30 determines whether the ECC stop flag fl is "1" or "0", and perform ECC operations based on the result.

In this embodiment, the ECC stop memory 23, which is formed by the ECC stop data bit 31 and the ECC stop check bit 32, can exclude possibility that the ECC stop data bit 31 itself is a defective memory cell and improve yield rate.

In the above embodiments, whether the replacement address information dt and the check information cb have been written in the previous redundancy repair operation is detected based on whether the check information cb is written in the check bit, but is not limited to this. For example, whether the replacement address information dt and the check information cb have been written in the previous redundancy repair operation can also be detected based on whether the replacement address information dt is written in the data bits. In addition, in the above embodiments, the ECC stop flag fl is set based on whether the check information cb is written in the check bit, but the ECC stop flag fl may be unused.

In each of the above embodiments, when other redundancy repair operations are started, the control unit 10 determines whether the check information cb has been written in the check memory 22, and inputs "1" to the ECC stop bits, but not limited to this. When writing the check information cb corresponding to the replacement address information dt, the error detection and correction unit 30 may not perform error detection and correction. For example, the control unit 10 may also input "1" as the ECC stop flag fl after performing the initial redundancy repair operation. The error detection and correction unit 30 obtains the ECC stop flag fl when performing the next redundancy repair operation.

The embodiments and modifications described above are described to make the present invention easy to understand and are not intended to limit the present invention. Therefore, each element disclosed in the above embodiments and modifications is intended to include all design changes or equivalents in the technical field of the present invention.

What is claimed is:

1. A semiconductor device, comprising:
a memory unit, being a one-time programmable memory, and comprising:
a data memory, written with replacement address information which is detected during a redundancy repair operation and corresponds to a defective memory cell of a memory cell array;
a check memory, written with check information which is detected during the redundant repair operation and corresponds to the replacement address information;
an error detection and correction unit, configured to perform error detection and correction on the replacement address information based on the check information; and
a control unit;
wherein the data memory comprises a unit to store the replacement address information;
wherein when the replacement address information is written into the unit, and other check information or other replacement address information has been written into the unit, the error detection and correction unit stops performing the error detection and correction;
wherein the control unit determines whether the other check information or the other replacement address information has been written into the unit when the replacement address information is written into the unit, and sets a flag to a first logical value when the other check information or the other replacement address information has been written into the unit;
wherein the error detection and correction unit stops performing the error detection and correction when the flag is set to the first logical value.

2. The semiconductor device as claimed in claim 1, wherein the control unit determines whether the check information corresponding to the replacement address information is written in the unit, and at the same time determines whether the defective memory cell is in memory cells of the unit;
wherein the control unit sets the flag to the first logical value when the check information is written and there is no defective memory cell in the unit.

3. The semiconductor device as claimed in claim 2, wherein a voltage outside a voltage range of a normal operation condition is applied to read at least one of the replacement address information and the flag to determine whether the defective memory cell is in the unit.

4. The semiconductor device as claimed in claim 1, wherein the memory unit includes flag data information and flag check information, the flag data information indicating whether the check information has been written into the unit, and the flag check information being appended to the flag data information;
wherein the control unit generates the flag data information and the flag check information according to whether the check information has been written into the unit.

5. The semiconductor device as claimed in claim 1, wherein the control unit determines whether the check information has been written when starting the redundancy repair operation, and sets the flag to the first logical value when the check information has been written.

6. The semiconductor device as claimed in claim 1, further comprising the memory cell array.

7. The semiconductor device as claimed in claim 1, wherein the semiconductor device is a volatile memory.

8. A control method of a semiconductor device,
wherein the semiconductor device comprises a memory unit, and the memory unit is a one-time programmable memory, and comprises:
a data memory, written with replacement address information which is detected during a redundancy repair operation and corresponds to a defective memory cell of a memory cell array; and
a check memory, written with check information which is detected during the redundant repair operation and corresponds to the replacement address information;
wherein the data memory comprises a unit to store the replacement address information;
wherein the control method of the semiconductor device comprises:
an error detection and correction step, configured to perform error detection and correction on the replacement address information based on the check information; and
a flag setting step, configured to determine whether other check information corresponding to the replacement address information has been written into the unit, and set a flag to a first logical value when the check information has been written into the unit;
wherein when any of the replacement address information or the check information corresponding to the replacement address information is written into the unit and other replacement address information has been written into the unit, the error detection and correction unit stops performing the error detection and correction;
wherein the error detection and correction step is not perform when the flag is set to the first logical value.

* * * * *